Oct. 4, 1955     T. OERTLI     2,719,903
ELECTRIC GRILL
Filed May 19, 1953
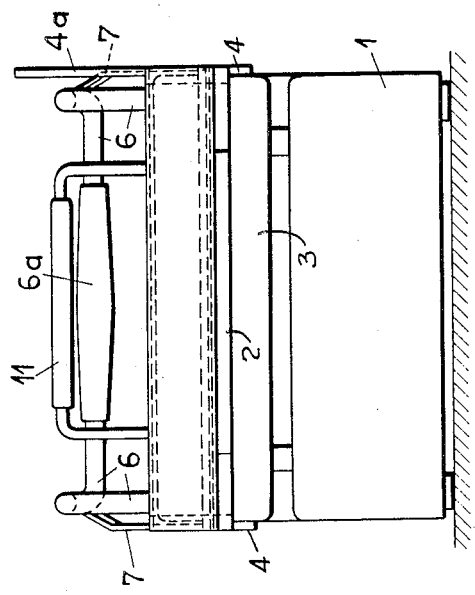
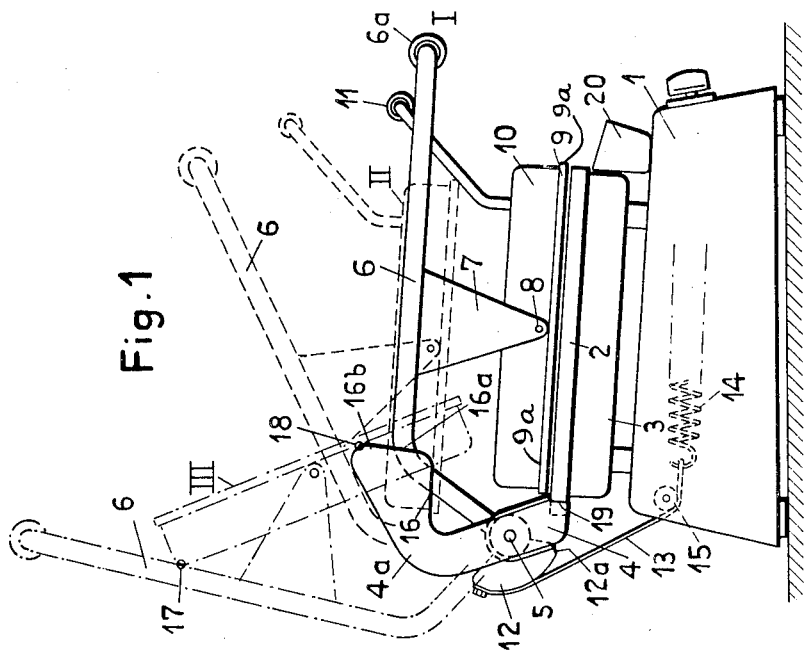

United States Patent Office 2,719,903
Patented Oct. 4, 1955

2,719,903

ELECTRIC GRILL

Traugott Oertli, Zurich, Switzerland

Application May 19, 1953, Serial No. 355,935

Claims priority, application Switzerland June 13, 1952

4 Claims. (Cl. 219—19)

The invention relates to electric grills having stationary heating plates mounted on a base and movable heating plates which can be brought opposite to the former.

An object of the invention is to provide for the convenient cleaning of the two heating plates. Accordingly, the invention provides means through which the movable heating plate can be swung into a position defined by at least one stop, in which position the heating plate surface stands transverse to the direction of viewing the plate.

Further features of the invention will appear from the following description, claims and drawing in which is represented a preferred embodiment of the invention.

Fig. 1 is a lateral view of the grill;

Fig. 2 is a front view of the grill according to Fig. 1.

In the embodiment illustrated in the annexed drawing, a heating plate 2 with a casing 3 for the heating element is mounted in a stationary position on the base 1. Fixed to each of opposite sides of the stationary heating plate 2 is a bracket 4 adapted to support an axle 5 having a stirrup 6 with a handle 6a pivotally arranged thereon. Fixed to the arms of the stirrup lever 6 are straps 7 on which the top plate 9 with a casing 10 for the heating elements is oscillatingly suspended. Attached to said casing 10 of the top plate 9 is a handle which projects within reach of the handle 6a of the swivelling stirrup 6.

By means of the lever 6, and handle 6a, the top plate 9 and casing 10 can be raised and lowered on the main pivot 5, while by means of the handle 11, and by the same hand, the top plate can be freely turned about the pivot 8.

At one side the bracket 4 has an extension in the form of a curved piece 4a as shown in Fig. 1.

Seated on the axle 5, there is moreover a sector 5 with spring pull 13 which is connected to a spring 14 located in the base 1. The spring pull 13 lies against a guide roller 15 in a base 1. Spring 14 and spring pull 13 are used for balancing the weight of the top plate in its various pivotal positions.

The mechanism illustrated serves to swing the top plate into a fixed position, in which its surface is transverse to the direction of viewing the plate in order to enable easy cleaning.

When the top plate 9 and casing 10 are raised by the swivelling stirrup 6 and handle 6a from the position I shown in full lines (Fig. 1), the top plate 9 and casing 10 hang freely on the axle 8 on the straps 7; consequently, when the stirrup 6 is swung from position I into position II, it performs a parallel movement (broken lines, position II). In this position, the edge 9a of the top plate 9, projecting laterally from the casing 10 strikes against the guide 16 of the curved piece 4a and, upon further raising the stirrup 6, rolls along the curve 16a, thus causing the plate 9 to swing about its pivot 8 on the straps 7 into position III shown in broken lines, where the plate 9 on the one hand bears against the arms of lever 6, as at 17, and on the other hand the edge 9a of plate 9 engages at 18 the curve 16b of the curved piece 4a. In position III the swivelling stirrup 6 will be retained by means of the spring-pull sector 12, in that its lower edge 12a rests on the edge 19 of the lower plate 2. By this means the plate 9 and casing 10 will be retained in raised position III, that is transverse to the normal direction of viewing by the person manipulating it, so that cleaning of the plate surface is rendered easy and convenient.

The curve guide 16, 16a, 16b on the curve piece 4a is so designed that the movable plate 9 and casing 10 will be swung from position II into position III by the guides 16, 16a, at first slowly and than more rapidly, when the edge of the plate has reached the guide 16b.

The curve guide 16, 16a, 16b, the arrangement and the dimensions of the top plate 9, 10 with respect to the bottom plate 2, 3 are moreover so provided, that the oil dripping from the top plate in position II will always pass on to the bottom plate whence, due to its inclined position on the base, it will be drained into a collector 20.

There will now be obvious to those skilled in the art many modifications and variations realizing many or all of the advantages of the apparatus described but which do not depart essentially from the spirit of the invention.

What I claim is:

1. An electric grill comprising a base, a stationary heating plate on said base, a movable heating plate adapted to be superposed on said stationary heating plate, a stirrup lever shaped to form a handle and having arms swingably mounted, at their extremities, on said stationary heating plate, said movable heating plate being pivotally suspended from said arms to be raised from said stationary plate by upward swinging of said stirrup lever, a curved guide piece fixed relative to said stationary heating plate and engaged by said movable heating plate during raising of the latter to pivot the movable heating plate relative to said stirrup lever into a cleaning position in which said movable heating plate simultaneously bears, at spaced points thereon located at opposite sides of its pivoting axis, against said arms of the upwardly swinging stirrup lever and said guide piece, and stop means fixed with respect to said stirrup lever and engageable with said stationary heating plate when said stirrup lever has been swung upwardly sufficiently to dispose said movable heating plate in said cleaning position to there limit upward swinging of the stirrup lever.

2. An electric grill according to claim 1, wherein said stop means includes a sector-shaped member fixed to said lever to swing with the latter and having an end face adapted to bear against said stationary heating plate in the upwardly limited position of the lever; and further comprising an elongated flexible member secured to and running along the periphery of said sector-shaped member, and a balance spring attached to said base and said flexible member to exert a pull on the latter for balancing the weight of the movable heating plate.

3. An electric grill according to claim 1, wherein said curved guide piece includes a straight edge portion extending substantially parallel to said stationary heating plate and spaced upwardly from the latter to engage said movable heating plate at one side of the pivoting axis thereof after initial raising of said movable plate, said straight edge portion terminating in a curved corner at the end closest to said pivoting axis and against which said movable plate rides during initial pivoting of the latter, said curved guide piece further having an upstanding straight edge portion extending from said curved corner and terminating, at its upper end, in a curved corner against which said movable plate bears when in its cleaning position.

4. An electric grill according to claim 3; wherein said upstanding straight edge and said corner at the upper end thereof of said curved guide piece are disposed above the rear portion of said stationary heating plate so that said movable heating plate, when in its cleaning position, lies in a plane intersecting said stationary plate to permit oil to drain from the movable plate on to said stationary plate.

References Cited in the file of this patent

UNITED STATES PATENTS

| | | |
|---|---|---|
| 1,257,513 | Messmer | Feb. 26, 1918 |
| 1,706,612 | Jaeger | Mar. 26, 1929 |
| 2,033,067 | Fromknecht | Mar. 3, 1936 |
| 2,102,097 | Sherman | Dec. 14, 1937 |
| 2,430,582 | Reich | Nov. 11, 1947 |